US006963810B2

(12) United States Patent
Mangalam

(10) Patent No.: US 6,963,810 B2
(45) Date of Patent: Nov. 8, 2005

(54) METHOD AND SYSTEM FOR LOCATING CRITICAL FLOW FEATURE INDICATORS IN THREE DIMENSIONAL FLOW REGIMES

(75) Inventor: Siva M. Mangalam, Williamsburg, VA (US)

(73) Assignee: Tao of Systems Integration, Inc., Hampton, VA (US)

( * ) Notice: Subject to any disclaimer, the term of this patent is extended or adjusted under 35 U.S.C. 154(b) by 0 days.

(21) Appl. No.: 10/778,666

(22) Filed: Feb. 13, 2004

(65) Prior Publication Data

US 2005/0049803 A1 Mar. 3, 2005

Related U.S. Application Data

(63) Continuation-in-part of application No. 10/653,494, filed on Sep. 2, 2003, now Pat. No. 6,826,493.

(51) Int. Cl.[7] .............................................. G01F 1/00
(52) U.S. Cl. ........................... 702/45; 702/50; 702/53; 702/54; 702/189; 73/147
(58) Field of Search ............................. 702/45, 50, 53, 702/54, 189; 73/170.12, 147, 170.16, 432.1, 73/861.64; 114/39.11; 244/203, 205; 340/966

(56) References Cited

U.S. PATENT DOCUMENTS

| 4,229,725 A | 10/1980 | Reilly ........................ 340/968 |
| 4,563,684 A | 1/1986 | Maris ........................ 340/966 |
| 4,649,387 A | 3/1987 | Maris ........................ 340/966 |
| 4,727,751 A | 3/1988 | Holmes et al. ............... 73/147 |
| 4,848,153 A * | 7/1989 | Stack et al. ................ 73/432.1 |
| 4,932,610 A | 6/1990 | Maestrello .................. 244/203 |
| 4,936,146 A * | 6/1990 | Stack et al. ................ 73/432.1 |
| 5,074,147 A | 12/1991 | Sarma ....................... 73/204.15 |
| 5,209,111 A * | 5/1993 | Agarwal et al. .............. 73/147 |
| 5,218,863 A | 6/1993 | Mangalam ................... 73/147 |
| 5,299,455 A | 4/1994 | Mangalam ................... 73/180 |
| 5,600,060 A | 2/1997 | Grant ........................ 73/147 |
| 5,796,612 A | 8/1998 | Palmer ....................... 701/4 |
| 5,890,681 A | 4/1999 | Meng ......................... 244/205 |
| 6,134,959 A | 10/2000 | Mangalam et al. ......... 73/170.12 |

(Continued)

OTHER PUBLICATIONS

S. Mangalam, "Real-Time Extraction of Hydrodynamic Flow Characteristics Using Surface Signatures", *Proceedings 13th International Symposium on Unmanned Untethered Submersible Technology*, Aug. 24-27, 2003.

(Continued)

*Primary Examiner*—Michael Nghiem
*Assistant Examiner*—Stephen J. Cherry
(74) *Attorney, Agent, or Firm*—Hunton & Williams LLP

(57) ABSTRACT

A method for locating two dimensional critical flow features on a surface of a three dimensional body immersed in a fluid stream is presented. The method includes applying a hot film sensor array on the surface of the body. The hot film sensor array includes a plurality of hot film sensor elements disposable in a two dimensional array over at least a portion of the body surface. Each sensor element is connected to an associated anemometer circuit to provide an output voltage. The method further comprises obtaining output voltage data for each hot film sensor element with the body immersed in the fluid stream under a set of flow conditions and processing the hot film sensor element output voltage data to locate at least one two dimensional critical flow feature on the body surface.

44 Claims, 16 Drawing Sheets

U.S. PATENT DOCUMENTS

| | | | |
|---|---|---|---|
| 6,169,496 B1 | 1/2001 | Martin et al. | 340/966 |
| 6,253,126 B1 | 6/2001 | Palmer | 701/14 |
| 6,390,417 B1 | 5/2002 | Yoshino | 244/203 |
| 6,424,923 B1 | 7/2002 | Huyer et al. | 702/45 |

OTHER PUBLICATIONS

S. Mangalam, "Phenomena-Based Real-Time Aerodynamic Measurement System (PRAMS)", *2003 IEEE Aerospace Conference Proceedings*, Mar. 8-15, 2003.

* cited by examiner

METHOD AND SYSTEM FOR LOCATING CRITICAL FLOW FEATURE INDICATORS IN THREE DIMENSIONAL FLOW REGIMES

CROSS-REFERENCE TO RELATED APPLICATIONS

This application is a continuation-in-part of U.S. application Ser. No. 10/653,494, filed Sep. 2, 2003, now U.S. Pat. No. 6,826,493 which is incorporated herein by reference in its entirety.

FIELD OF THE INVENTION

The invention relates generally to the measurement of aerodynamic and hydrodynamic flow phenomena and, more particularly, to identification of multi-dimensional critical flow feature indicators on three dimensional bodies instrumented with surface-mounted hot-film sensors.

BACKGROUND OF THE INVENTION

Three-dimensional boundary layer flow phenomena such as attachment, separation, vortex flow and laminar-to-turbulent transition have been difficult to measure in practical applications. Traditionally, flow visualization techniques have been used to determine three-dimensional flow separation regions on bodies in motion. Some success has been achieved in obtaining laminar and turbulent separation in two-dimensional flows. Currently, however, there are no techniques available to determine bifurcation regions in realistic three-dimensional flows.

Such flow situations exist in many practical applications including airflow over external surfaces such as aircraft fuselages, wings, empennage, automobile bodies, etc, and on internal surfaces, such as jet engine inlets, automobile intake diffusers, etc. It is often necessary to determine flow effects such as separation and reattachment in varying conditions in order to properly design and control the airflow over and around these bodies. Similar situations exist in the case of water, fuel, or other liquid flow over marine vehicle bodies such as submarine and ship hulls, keels, and through ducts and pipes.

All of these flow conditions result in three-dimensional boundary layer phenomena such as turbulence, flow separation and reattachment, and vortex distribution. There is a need for a sensing system and methodology for identifying and characterizing these phenomena for a three dimensional body under real flow conditions without breaching the structural integrity of the body's surface.

SUMMARY OF THE INVENTION

An illustrative aspect of the invention provides a method for locating two dimensional critical flow features on a surface of a three dimensional body immersed in a fluid stream. The method comprises applying a hot film sensor array on the surface of the body. The hot film sensor array comprises a plurality of hot film sensor elements disposable in a two dimensional array over at least a portion of the body surface. Each sensor element is connected to an associated anemometer circuit to provide an output voltage. The method further comprises obtaining output voltage data for each hot film sensor element with the body immersed in the fluid stream under a set of flow conditions and processing the hot film sensor element output voltage data to locate at least one two dimensional critical flow feature on the body surface.

Another illustrative aspect of the invention provides an automated system for locating two-dimensional critical flow features on a surface of a three dimensional body immersed in a fluid stream. The system comprises a hot film sensor arrangement comprising a plurality of hot film sensor elements appliable in a two dimensional array over at least a portion of the body surface. The system further comprises an anemometer circuit arrangement having a plurality of anemometer circuits. Each anemometer circuit is in communication with an associated hot film sensor element and is configured to provide a sensor signal corresponding to heat transfer from the associated hot film sensor to the fluid stream. The system also comprises a data processing system in communication with the anemometer arrangement. The data processing system includes a signal receiving portion and a critical flow feature mapping portion. The signal receiving portion is in communication with the anemometer arrangement and is adapted for receiving and processing sensor signals from the anemometer circuits. The critical flow feature mapping portion is in communication with the signal receiving portion and is adapted for processing the sensor signals to determine the location of at least one critical flow feature line on the body surface.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

The present invention provides methods and apparatus for detecting and mapping critical flow feature indicators (CFFIs) in three-dimensional flow regimes. Three dimensional flow phenomena that may be identified and/or characterized through the use of CFFIs may include flow bifurcation, laminar-to-turbulent transition, vortex flow and shock transition. As used herein, flow bifurcation refers to separation of flow from or reattachment of flow to a body immersed in a fluid.

It will be understood by those of ordinary skill in the art that the methods of the present invention apply to all fluid flow regimes. Thus, although the term "aerodynamic" may be used in describing the phenomena that may be investigated using embodiments of the invention, the invention may also be used to investigate hydrodynamic phenomena or similar phenomena arising in any other fluid flow regime.

The invention provides a sensing system that can be located on a surface of an aerodynamic (or hydrodynamic) body without disturbing the flow around the body and without breaching the structural integrity of the body surface. This system uses surface-mounted hot-film sensors that require a minimum of under-surface modifications to the body structure and provide a high degree of spatial resolution and a high dynamic response. Further, the sensor system of the invention allows detection of three-dimensional flow bifurcation regions without a priori knowledge of the local streamline directions.

Figure 1:
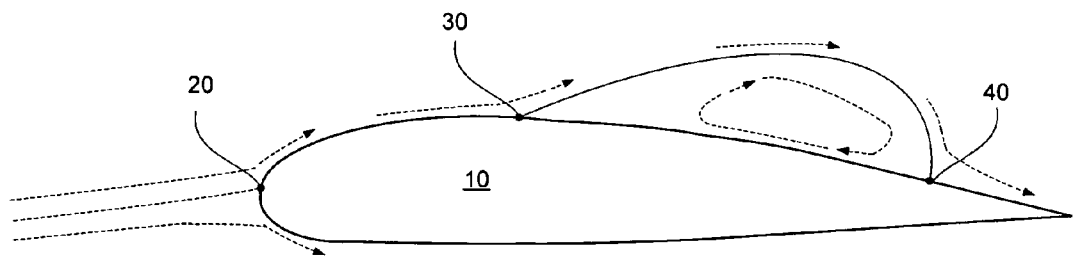
FIG. 1 is a schematic representation of bifurcation flow features for an airfoil.

For a two dimensional body such as an airfoil section, CFFIs may generally be associated with single points on the surface of the body. These points represent the locations associated with the interaction of flow features with the body surface. For example, flow bifurcation points (FBPs) are defined as the locations on the body surface where the flow attaches to or separates from the body. As shown in the idealized representation of FIG. 1, an airfoil 10 may have several FBPs including the leading edge stagnation point (LESP) 20, flow separation point, 30 and flow reattachment point 40.

Other two dimensional flow CFFIs may include a mean boundary layer transition point and a shock transition point. The mean boundary layer transition point is associated with the mean surface location of the transition from laminar to turbulent boundary layer flow. The shock transition point is associated with the intersection of a shock with the surface of the body.

Shear stress and convective heat transfer can be used to determine the location of CFFIs on the surface of an airfoil. As discussed in U.S. Pat. No. 6,134,959, which is incorporated herein by reference in its entirety, and U.S. patent application Ser. No. 10/653,494 ("'494 application"), a line of hot film sensors may be formed on or adhered to the surface of an airfoil to locate these points in steady and unsteady flow regimes. Hot film sensors use the principle that the resistance of a thin, hot-film element is a function of the geometry of the element and its operating temperature. The sensor element can be heated to a value above the stagnation temperature of the ambient flow to establish a temperature gradient between the sensor element and the ambient flow. This gradient causes heat to be transferred to the flow by convection and to the substrate through conduction. The heat lost to the flow through convective heat transfer may be used to measure surface flow conditions. When a hot-film sensor is located at a flow bifurcation point, the convective heat transfer from the sensor will be at a minimum compared to sensors located away from such points.

As discussed in detail in the '494 application, hot film sensors may be used in conjunction with anemometer circuits to provide signals relatable to the convective heat transfer at the sensor location. Although various types of anemometer circuits (e.g., constant current anemometers (CCA) and constant temperature anemometers (CTA)) can be used, it has been found that constant voltage anemometers (CVA) are particularly suitable for identifying and locating flow phenomena in real time. CVAs do not require critical adjustments to account for changes in flow conditions. Further, they provide a flat, customer-specified bandwidth, have high signal-to-noise ratio, and are practically immune to EMI, RFI, and cable-capacitance effects.

Figure 2:
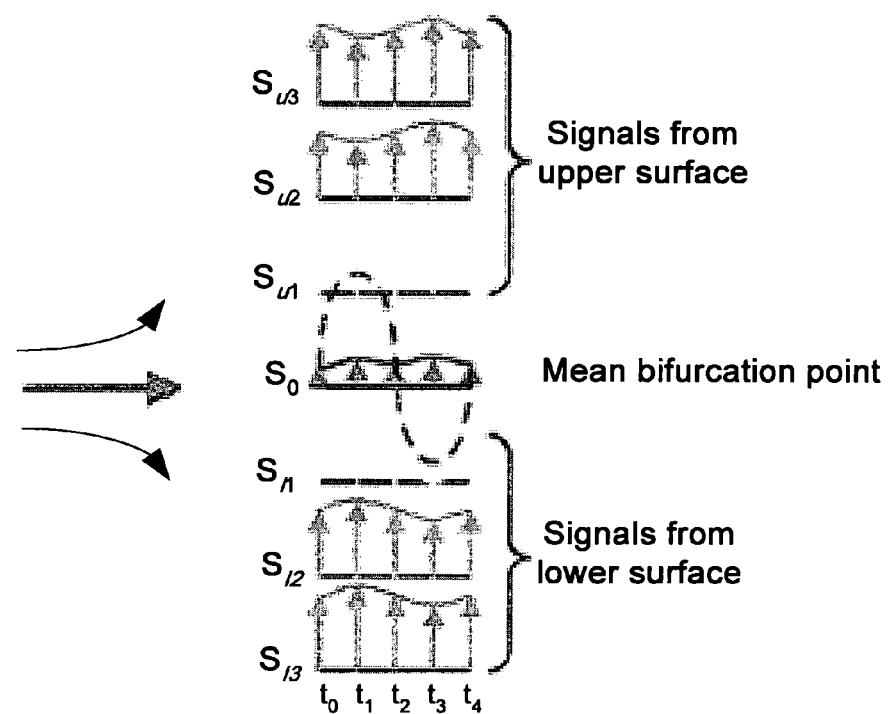
FIG. 2 is a graphical representation of sensor signal time series behavior in the vicinity of the leading edge stagnation point of an airfoil.

CVA output signals from hot film sensors located in the neighborhood of FBPs exhibit certain telltale characteristics. FIG. 2 illustrates CVA output signal behavior in the vicinity of the LESP of an airfoil. Sensor S0 is located at the mean LESP, sensors $S_{u1}$, $S_{u2}$ and $S_{u3}$ are rearwardly spaced along the upper surface of the airfoil and sensors $S_{l1}$, $S_{l2}$ and $S_{l3}$ are rearwardly spaced along the lower surface of the airfoil. At time $t_0$, when the instantaneous bifurcation streamline is at sensor $s_0$, the CVA output from this sensor has a minimum voltage because there is little heat convection. The other sensors get relatively more cooling because of greater convective heat transfer to the flow. Hence, as the flow accelerates from the LESP, the output voltages from the sensors will increase with rearward distance from the LESP. If at a later time, $t_1$, the instantaneous LESP moved to the sensor location $S_{l1}$, the minimum voltage signal would occur at this sensor location. Similar changes take place for any FBP, as the instantaneous FBP moves back and forth, as shown by the dashed line.

The locus of arrowheads for each sensor location in FIG. 2 represents sensor output signal (time series) at each spatial location. The following features can be observed:
1. The output signal from the sensor located at the mean FBP exhibits the lowest mean output voltage compared to sensors on either side of it;
2. Signals from sensors located on one side of the bifurcation point are in phase
3. Signals from sensors located across FBP exhibit a phase-reversal signature.
4. The sensor located at the mean FBP exhibits a double frequency for every cycle.

Given a sufficient number of sensors, any or all of these features can be used to assist in analytically identifying the location of FBPs on a body. It should be noted, however, that the effectiveness of techniques based on these behaviors may be highly dependent on the ability to obtain data for all sensors in a substantially simultaneous manner.

A similar method may be used to identify the existence of a shock and precisely determine its location based on the occurrence of a sharp transition from low to high voltage levels between adjacent sensors. Sensors just downstream of this voltage spike would produce very low voltage output indicative of a separation region.

In addition to the flow separation phenomena described above, multi-element hot film sensors can also be used to map the boundary layer transition from laminar to turbulent flow. In the laminar region, the shear stress is relatively low and disturbances are minimal. The transition region is characterized by the presence of intermittent large disturbances (spikes/bursts). These are large-scale structures that eventually breakdown into smaller and more uniformly distributed disturbances (turbulence) in the turbulent region.

Figure 3:
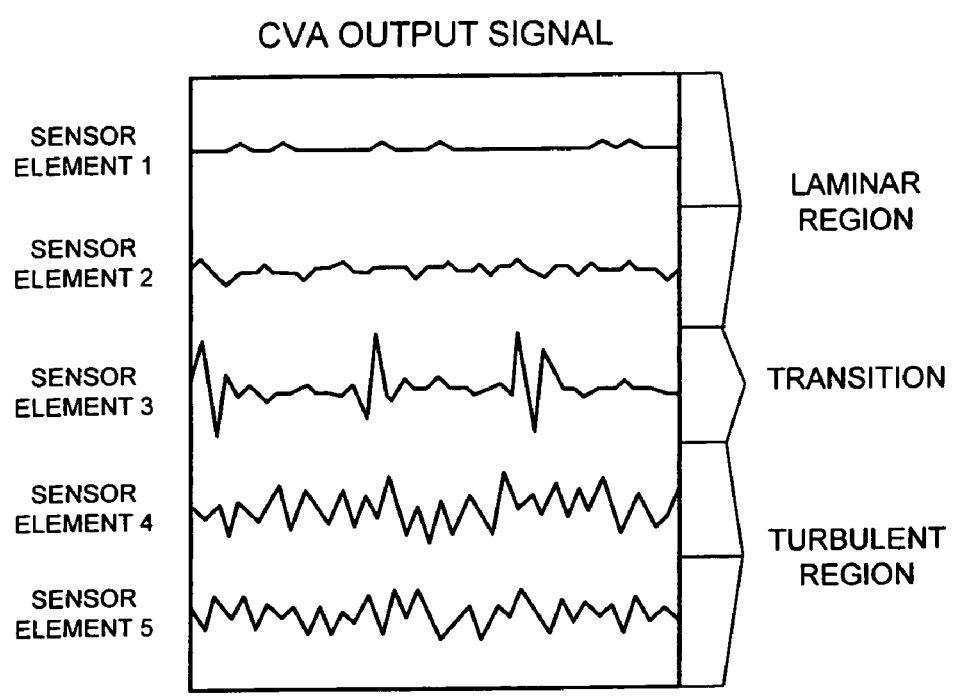
FIG. 3 is a graphical representation of raw anemometer signals versus time for five hot-film sensors on an airfoil during an exemplary test flow circumstance.

FIG. 3 illustrates the effects of these regional differences on sensor output. Thin film sensor elements 1–5 are arranged in sequence along the surface of an airfoil with element 1 in the forward-most position. For the illustrated flow circumstance, a visual review of the data shows that sensors 1 and 2 exhibit little disturbance and are thus in the laminar flow region. Sensors 4 and 5 exhibit significant but uniformly distributed disturbances and are thus clearly in the turbulent region. Sensor 3 exhibits a series of large intermittent bursts indicative of the transition region.

Figure 4:
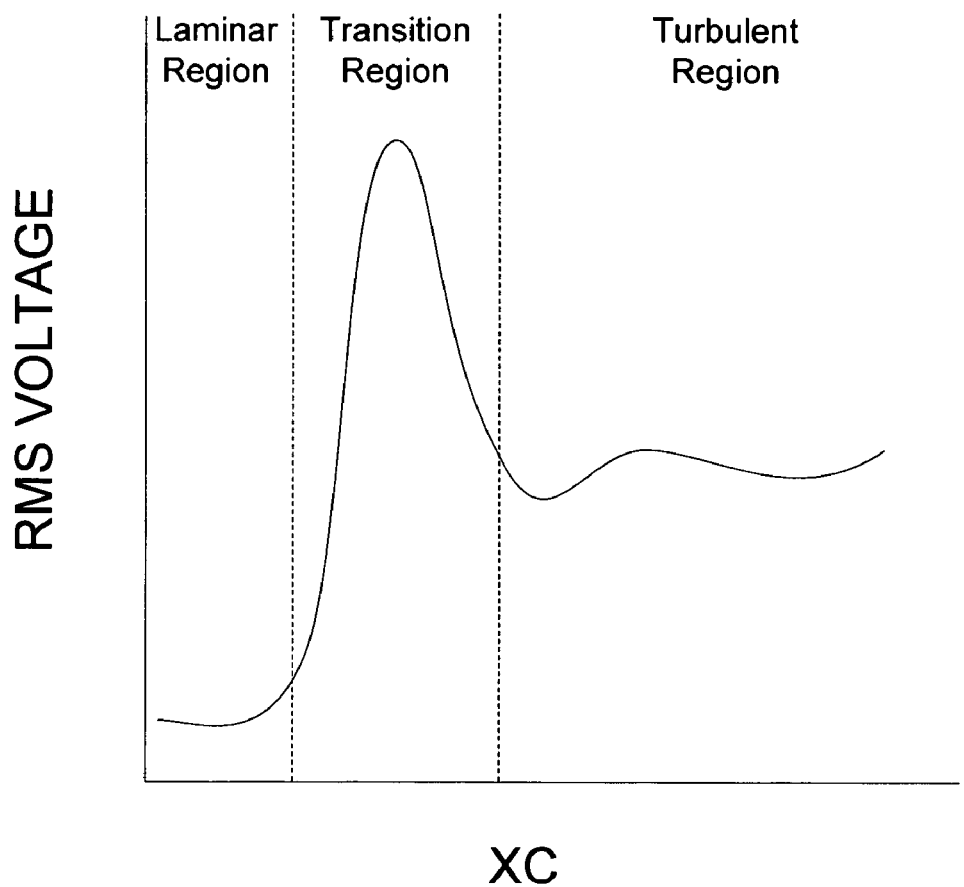
FIG. 4 is a graphical representation of variation in sensor RMS voltage with position along the surface of an airfoil.

It can be seen that because of the relatively lack of disturbance, sensors in the laminar region produce relatively low RMS voltage levels. In contrast, the large intermittent disturbances in the transition region produce sharply higher RMS voltage. Sensors in the turbulent region produce RMS voltage values that are higher than those in the laminar region but higher than those in the transition region. FIG. 4 illustrates a plot of RMS voltage versus normalized surface location that can be used to approximate the boundaries of the transition region and/or determine a mean transition point.

Figure 5:
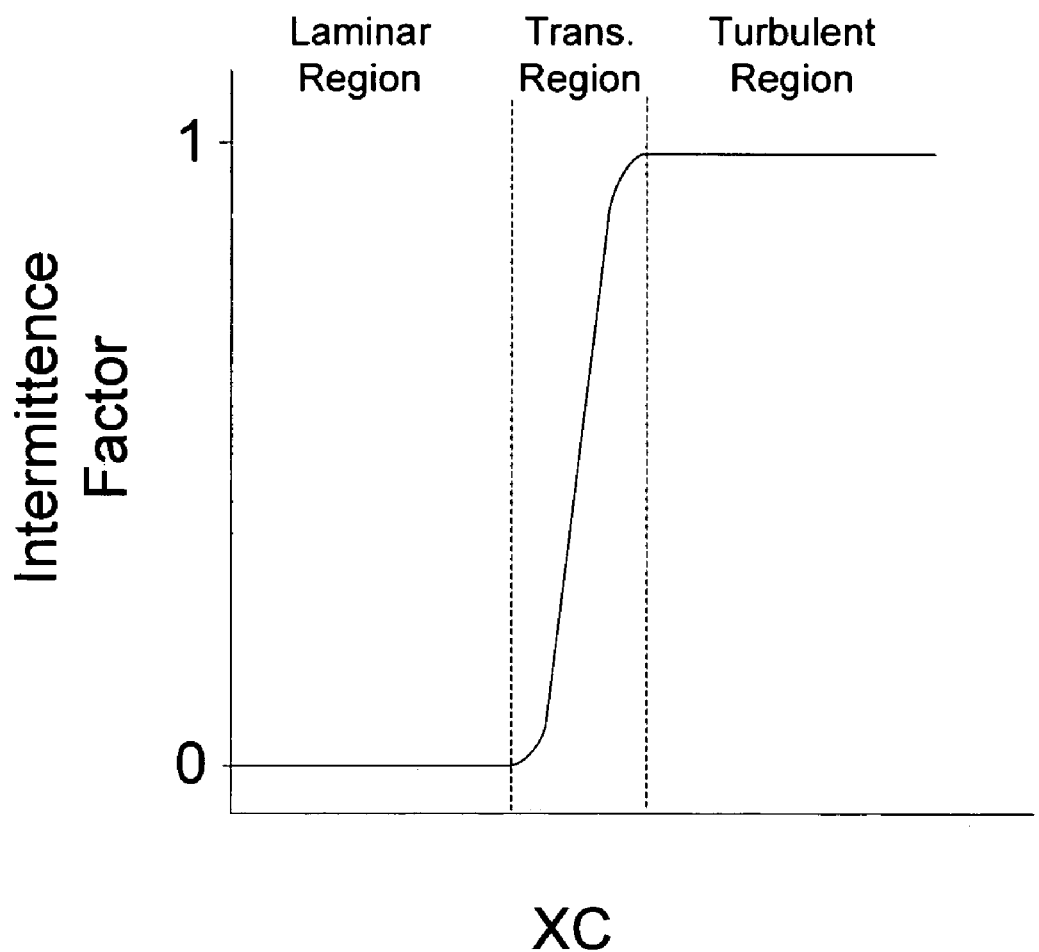
FIG. 5 is a graphical representation of variation in intermittence factor with position along the surface of an airfoil.

Another approach to determining transition region boundaries is through the use of intermittence. Intermittence is a normalized expression of relative turbulence levels. It is computed as a ratio of the time duration when the flow is turbulent to the total sample time. According to this criterion, laminar flow will exhibit nearly zero intermittence whereas a turbulent flow will have an intermittence of nearly one. Transition region is determined by characterizing the intermittence factor (IF). In order to compute intermittence from test data, a threshold voltage is specified (e.g., a voltage that is marginally above the electronic noise of the thermal anemometer). A clock is set up and the number of times the output voltage exceeds the threshold is counted. The number of events when output voltage exceeds the threshold is divided by the total time to provide IF. As shown in FIG. 5, the laminar region is characterized practically by IF=0 and turbulence by IF=1. The region in between these values is identified as transition.

Figure 6:
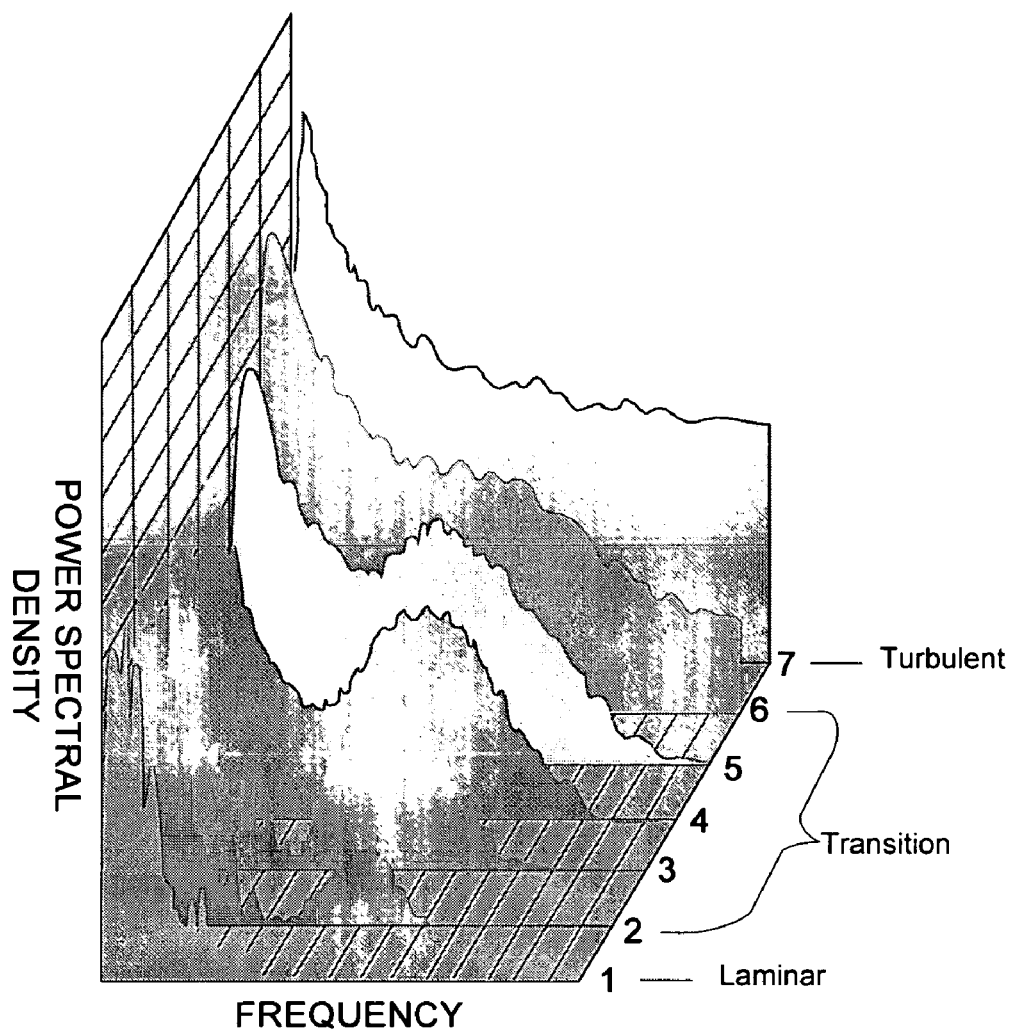
FIG. 6 is a three axis graphical representation of the spectral density behavior of sensor output in the vicinity of a boundary layer transition region.

FIG. 6 illustrates yet another method of locating transition boundaries. FIG. 6 shows frequency plotted along the abscissa, power spectral density along the ordinate, and sensor location in the (flow) z-direction for sensors 1–7. Fast Fourier Transforms or similar signal processing techniques may be used to obtain spectral characteristics for raw time-series signals such as those shown in FIG. 3. Most of the energy (power spectral density) of the flow is contained in the low frequency region for sensors located in the laminar boundary layer region (exemplified by sensor 1). The transition region is characterized by the presence of increased energy in certain bands of frequencies (e.g., sensors 3, 4 and 5). The turbulent region is characterized by the presence of a broad-band spectrum across all frequencies (sensor 7).

The actual determination techniques applied to the sensor signals to establish the transition point may be based on any time domain technique using, for example, peak RMS signal, intermittence factor, skewness or flatness, or based on a frequency domain technique using, for example, spectral density. Techniques based on other domains and spaces (e.g., wavelet techniques, Hilbert techniques, etc.) may also be used.

By closely spacing a large number of sensors, the above data analysis techniques can each provide an accurate analytical determination of the location of the transition zone and the mean transition point. By applying multiple data analysis techniques, an even more accurate determination can be made.

As discussed above, 2-D flow CFFIs can be identified using a set of sensors arranged in a linear fashion along the direction of the streamlines of the flow. The location and movement of individual CFFI points is determined by the location of minimum voltage signals, phase reversal between adjacent sensors and comparison of time-related signal behavior between adjacent sensors. In three dimensional fluid flow, however, critical flow features interact with the body surface, not at a single point, but along a two dimensional line. For example, instead of flow bifurcation points (i.e., attachment point, separation point and reattachment point), there are bifurcation lines (i.e., attachment line, separation line and reattachment line) that separate the body surface into attached flow regions and unattached flow regions. These lines may be continuous or non-continuous and are likely to be non-linear. The regions bounded by flow bifurcation lines may be highly irregular.

Figure 7:
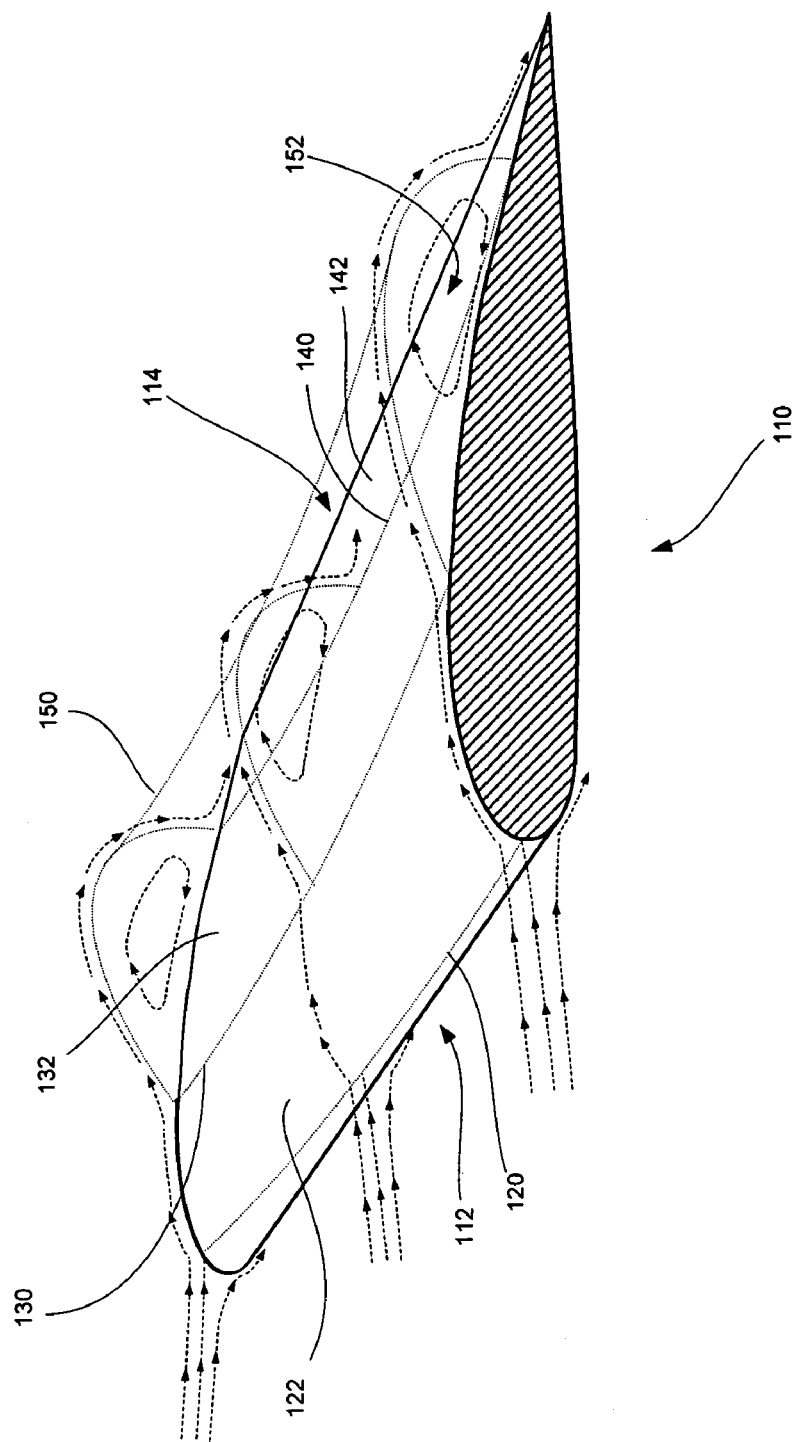
FIG. 7 is a perspective view of a wing section immersed in a fluid stream, the view schematically illustrating flow bifurcation phenomena.
Figure 8:
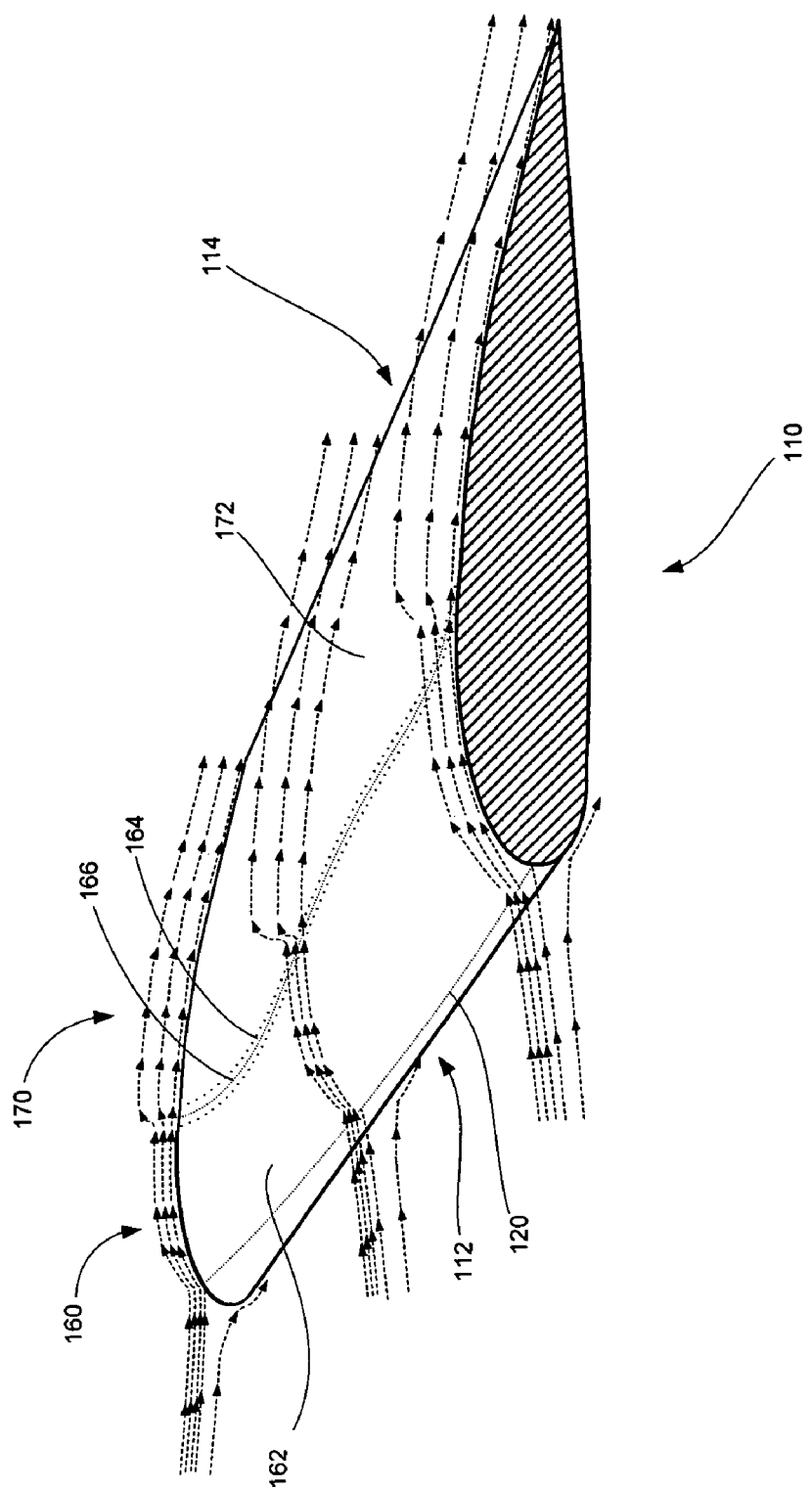
FIG. 8 is a perspective view of a wing section immersed in a fluid stream, the view schematically illustrating boundary layer transition phenomena.
Figure 9:
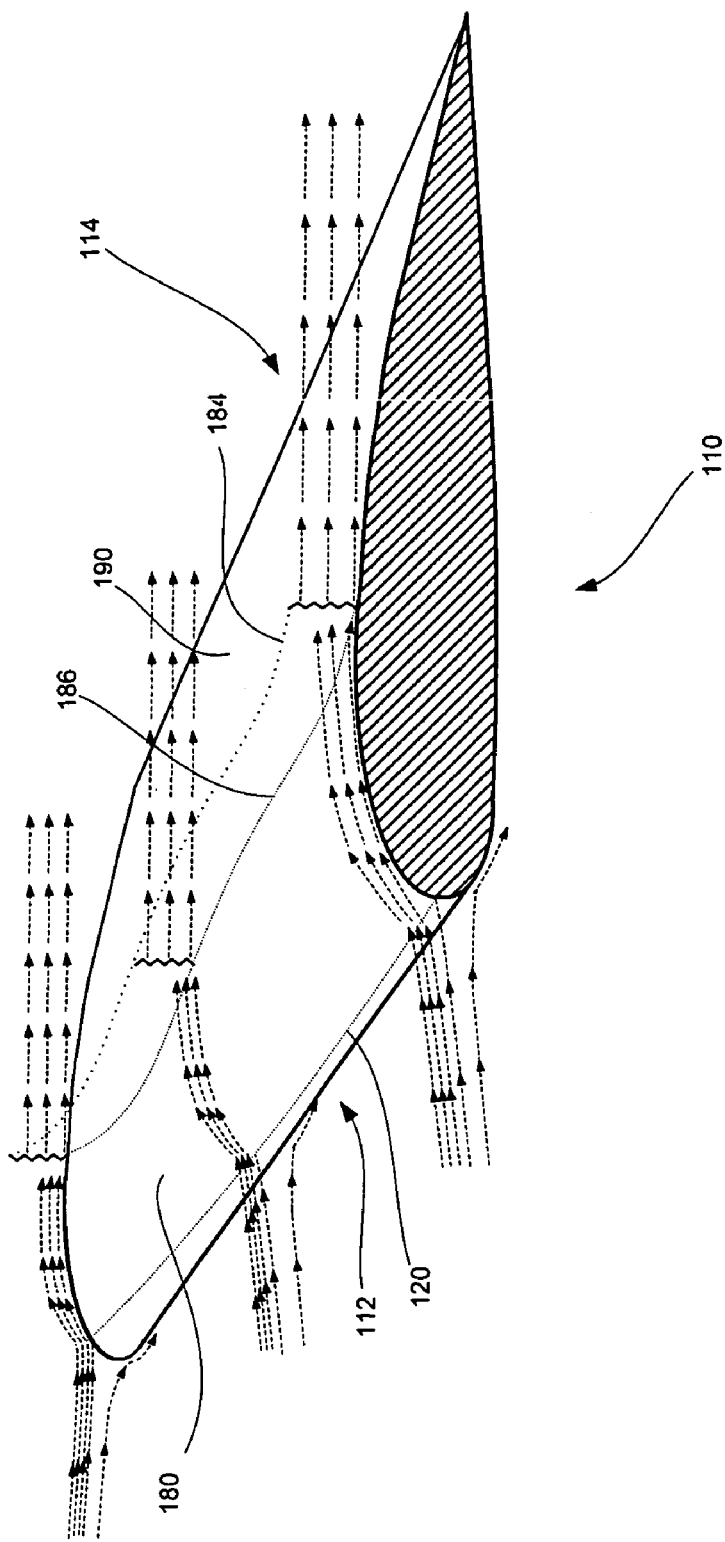
FIG. 9 is a perspective view of a wing section immersed in a fluid stream, the view schematically illustrating shock interaction phenomena.

FIGS. 7–9 provide schematic illustrations of three dimensional flow phenomena and associated CFFIs for a three dimensional wing section 110. The wing section 110 has a leading edge portion 112 and a trailing edge portion 114. FIG. 7 illustrates flow bifurcation phenomena (attachment, separation and reattachment), FIG. 8 illustrates transition from laminar to turbulent boundary layer flow and FIG. 9 illustrates shock behavior. In each figure, illustrative streamlines are shown at three span-wise locations along the wing section 110. It will be understood that these streamlines are used to schematically represent flow phenomena and are not to scale.

With reference to FIG. 7, it can be seen that three dimensional freestream flow attaches to the leading edge 112 along a leading edge attachment line 120. The flow then separates from the upper surface of the wing section 110 along a separation line 130 and reattaches along a second attachment line 140 near the trailing edge 114. The leading edge attachment line 120 and the separation line 130 form the boundaries of a first attached flow region 122 on the upper surface of the wing section 110. The separation line 130 and the second attachment line 140 form the boundaries of a separated flow region 132 on the surface of the wing section 110. The separated flow forms a flow separation bubble 150 in which flow reversal/recirculation 152 occurs. A second attached flow region 142 extends from the second attachment line 140 to the trailing edge 114.

FIG. 8 illustrates the transition from laminar flow 160 to turbulent flow 170 for a particular flight condition. In this case, the freestream flow again attaches to the wing section 110 along a leading edge separation line 120. Over a first region 162 of the upper surface of the wing section 110, the flow in the boundary layer is laminar. Over a second region 172 of the upper surface of the wing section 110, the flow in the boundary layer is turbulent. The laminar region 162 and the turbulent region 172 are separated by a transition region 164. The transition region 164 is a narrow band across which the flow trips from laminar to turbulent. As shown in FIG. 8, the transition region 164 may be mapped using an estimated transition onset line 165, a mean transition line 166 and an estimated transition completion line 167. As with flow bifurcation lines, the transition lines 165, 166 and 167 may be non-linear or discontinuous and the geometry of the laminar, transition and turbulent flow regions 162, 164, 172 may be highly irregular.

FIG. 9 illustrates a flight condition in which the flow encounters a shock curtain 184 on the surface of the wing section 110. The shock curtain 184 intersects the surface of the wing section 100 along a shock interaction line 186, which divides the wing surface into an attached pre-shock region 180 and a separated post-shock region 190. Like the previous three dimensional flow CFFIs, the shock interaction line 186 may be non-linear or discontinuous.

Although the two dimensional nature of the above-described CFFIs differentiates the three dimensional flow analysis from analysis of the single point CFFIs of the two dimensional flow case, there are significant common features: (1) The shear stress distribution on the surface of a body in three dimensional flow exhibits a minimum across a flow bifurcation line just as it exhibits a minimum at a flow bifurcation point; and (2) shear stress disturbances in the laminar, transition and turbulent regions exhibit the same behavior as in two dimensional flow.

Accordingly, sensors capable of measuring the relative shear stress normal to the local streamline can be used to determine the location and geometry of bifurcation lines and transition boundaries. To identify bifurcation lines, thin film sensors are used to identify the locations of shear stress minima throughout the sensor matrix. Minimum output signals are received from sensors located at or near bifurcation lines and a phase reversal signature can be identified for signals from sensors located on opposite sides of the bifurcation line. Similarly, output signals from the various sensors in attached flow regions can be used to identify sub-regions producing low RMS voltage (i.e., laminar flow regions), high RMS voltage (transition flow regions) and intermediate RMS voltage (turbulent flow regions). Time varying data from these sensors may also be used to identify laminar, transition and turbulent regions based on IF or disturbance frequency analysis.

Although the basics of CFFI determination in 3-D flow regimes are similar to the 2-D approach, the measurement of CFFI lines (as opposed to points) poses two problems:
 (1) Unlike in the 2-dimensional flow case, the three dimensional flow CFFI lines may be curved; and
 (2) With three dimensional flow, the direction of the local streamline will not be known in advance.

The first of these problems means that a sensor array with sensor elements arranged in a single straight line is not suitable for three dimensional flow. This is because the identification of bifurcation lines depends on comparison of signals from multiple sensors. If the sensitivity of a particular sensor changes as the streamline moves away from an expected direction, the comparison of the output from that sensor to another sensor may produce misleading results. For example, for thin film sensors having a linear sensor element, the sensitivity of the sensor element is proportional to the cosine of the angle between the local streamline and the sensor element. A comparison of voltages from such sensors in a three dimensional flow regime may thus produce false minima in areas where there is a significant angle between the streamline and the sensor element.

The second problem means that the sensors used must have a sensitivity that is substantially independent of the streamline direction. In three dimensional flow regimes, the presence of cross-flow means that the flow direction at adjacent sensors may vary. Thus, if sensor output is highly dependent on flow direction, a valid comparison of sensor readings cannot be accomplished unless the flow direction is already known. Sensor elements that must be pre-aligned according to the local streamline direction cannot be used.

The present invention solves these problems through the use of a sensor system specifically designed for three dimensional flow determination. The first problem is solved through the use of a two-dimensional sensor matrix rather than a single linear sensor array. In this matrix, sensor elements may be located in two orthogonal directions. As will be discussed in more detail hereafter, the second problem is solved through the use of sensor elements configured to provide uniform sensor sensitivity irrespective of the direction of the local streamline.

The sensor systems used for three dimensional CFFI identification use thin film sensors that are operationally similar to those discussed above. As before, the sensors are used to measure the relative heat lost to the flow through convective heat transfer at various points on a surface immersed in the flow.

Figure 10:
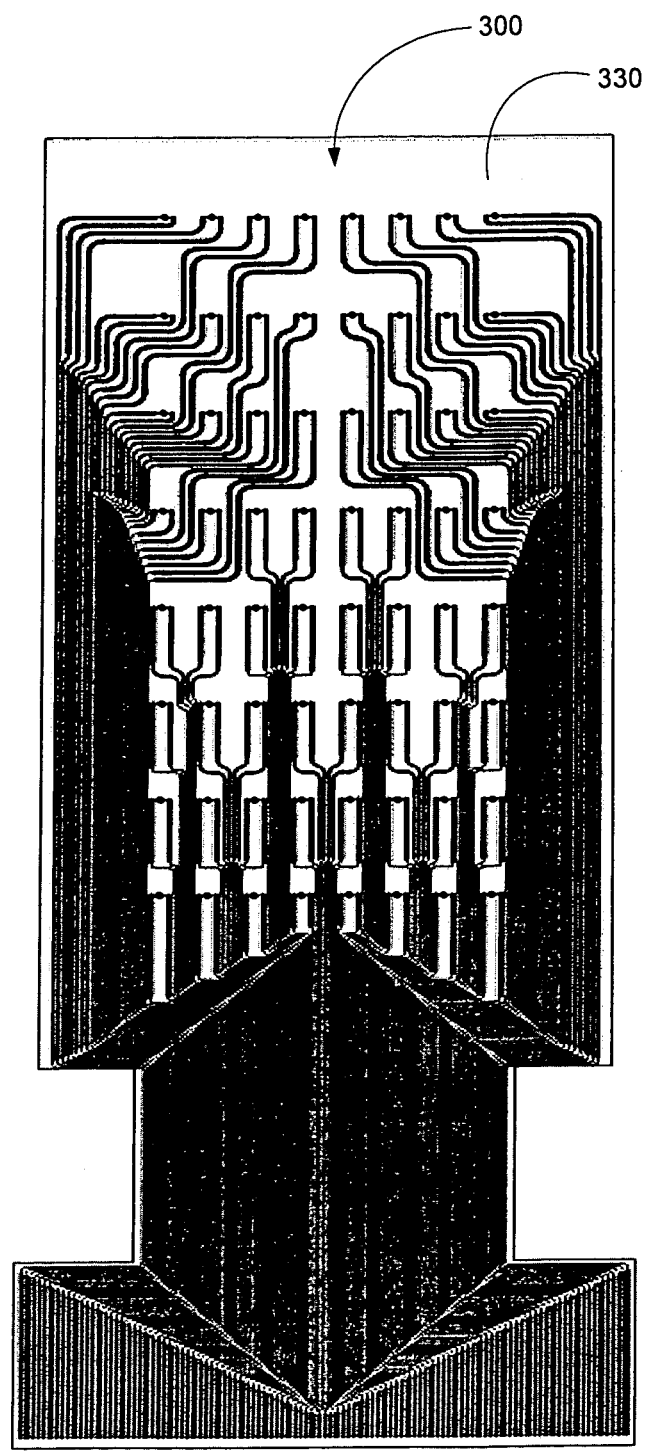
FIG. 10 is a plan view of a hot-film sensor array that may be used in the systems and methods of the invention.
Figure 11:
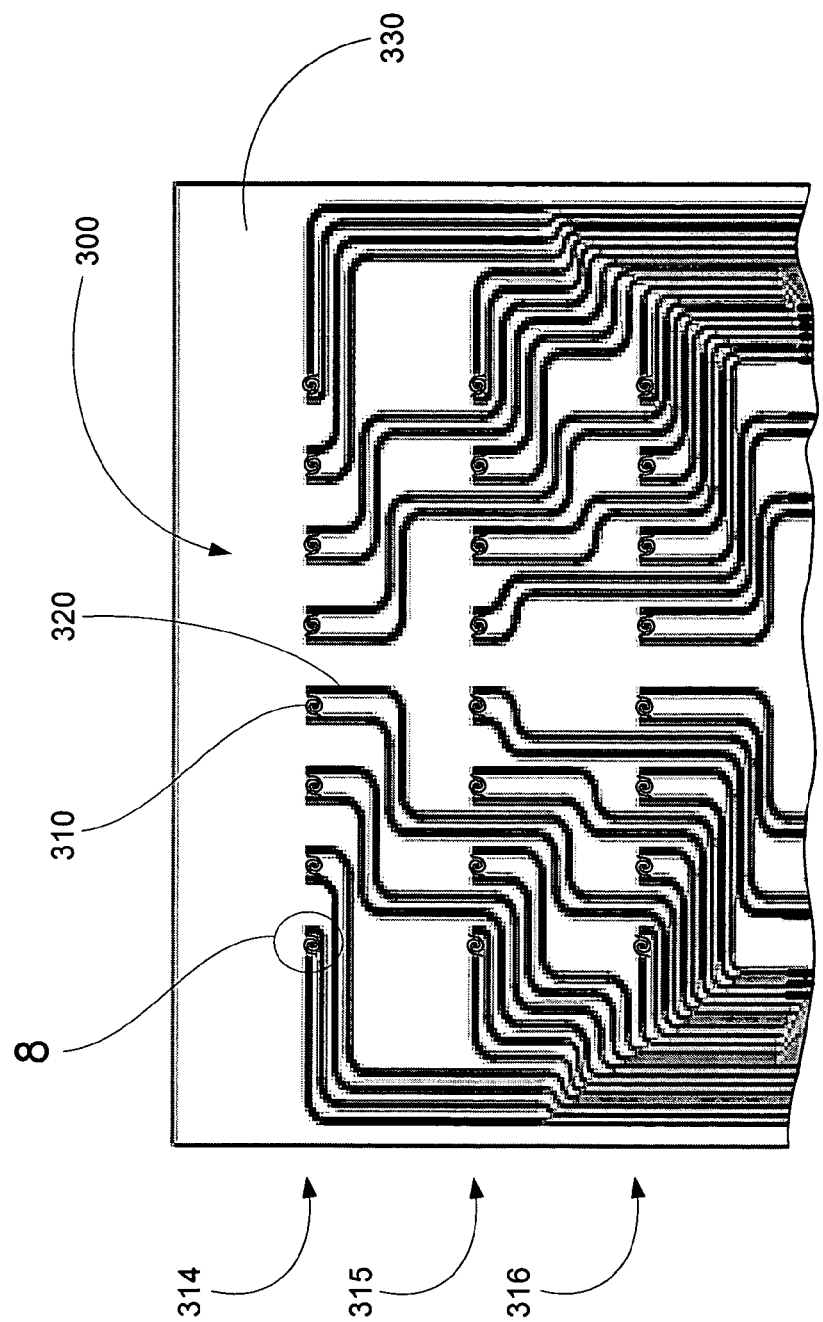
FIG. 11 is a magnified plan view of a portion of the hot-film sensor array of FIG. 10.

A two dimensional array of thin film sensor elements can be used to provide a complete definition of curved CFFI lines on a body surface. With reference to FIGS. 10 and 11, a sensor array 300 may consist of a plurality of sensor elements 310 and associated leads 320 with the sensor element 310 arranged in a series of columns and rows on a flexible, insulated substrate 330. In an exemplary embodiment, the sensor elements 310 are 0.25-micron nickel elements and the leads 320 are 2-micron-thick copper leads vacuum deposited on the flexible substrate 330.

The arrangement of the sensor elements 310 may be varied according to user requirement. For example, the sensor array 300 shown in FIGS. 10 and 11 is made up of a matrix of eight rows and eight columns of sensor elements 310. The first three rows 314, 315, 316 of sensor elements 310 are shown in FIG. 10. It will be understood by those of ordinary skill in the art that the size of the sensor array 300 and the number and placement of elements 310 are unlimited and will generally be a function of the size of the body being instrumented and the spatial resolution required by the user. It will also be understood that an overall sensor set for a particular body may comprise a plurality of sensor arrays 300, each having a plurality of sensor elements 310.

Figure 12:
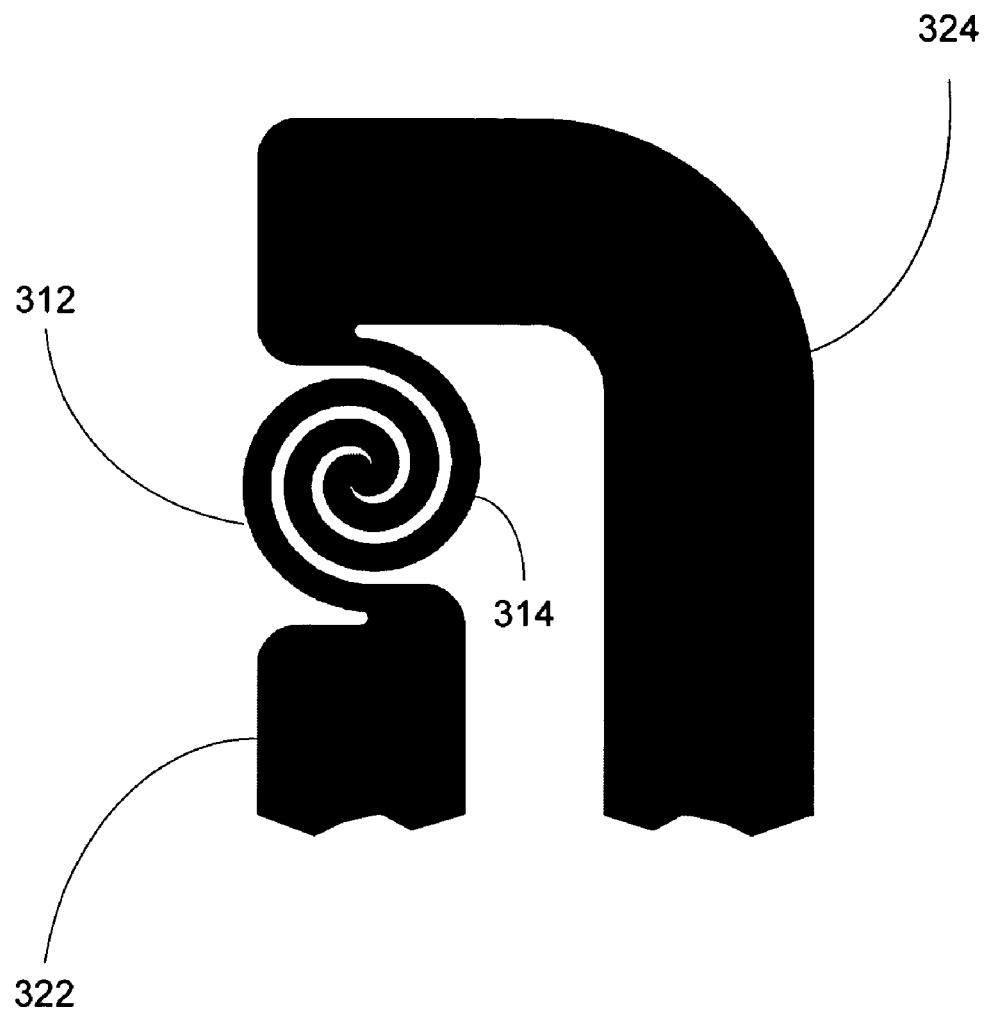
FIG. 12 is a plan view of a hot film sensor element that may be used to practice the methods of the invention.

The sensor elements used in the two dimensional sensor arrays of the invention may be of any type having sufficient and consistent sensitivity to allow comparison of signal output between sensors. As discussed above, it is of particular value in practicing the methods of the invention that the sensors used have a sensitivity that is relatively independent of flow direction. Accordingly, in a particularly effective embodiment, the sensor elements 310 of the sensor array 300 are of a spiral type adapted to reduce the effects of flow direction on sensitivity. As shown in FIG. 12, the sensor element 310 is formed as a dual spiral with a first element portion 312 extending from a first lead 322 and forming a first 540 degree spiral terminating at its center and a second element portion 314 extending from a second lead 324 and forming a second 540 degree spiral that is a mirror image of the first spiral. The second spiral also terminates at its center where it is joined to the first spiral.

The dual spiral configuration of the sensor element 310 assures that the relative output of the element is determined only by the total shear stress produced by the flow with relative immunity to the direction of the flow relative to the sensor element.

Figure 13:
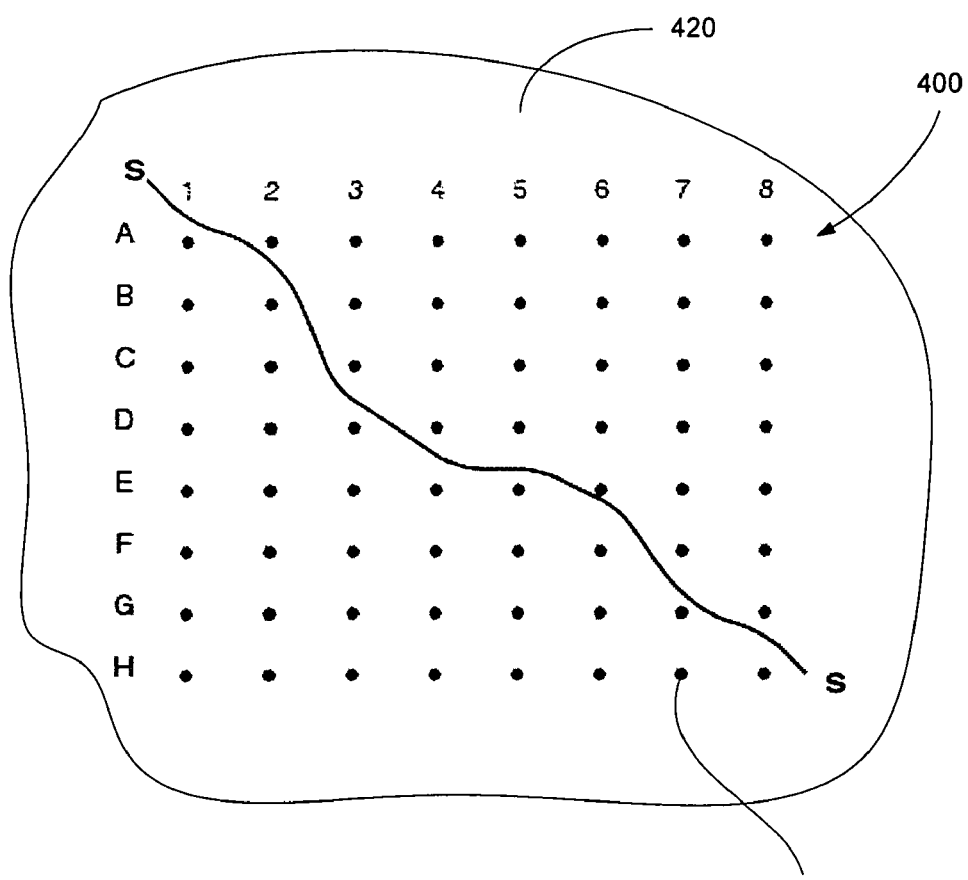
FIG. 13 is a schematic representation of a bifurcation line on a portion of an instrumented body surface.
Figure 14:
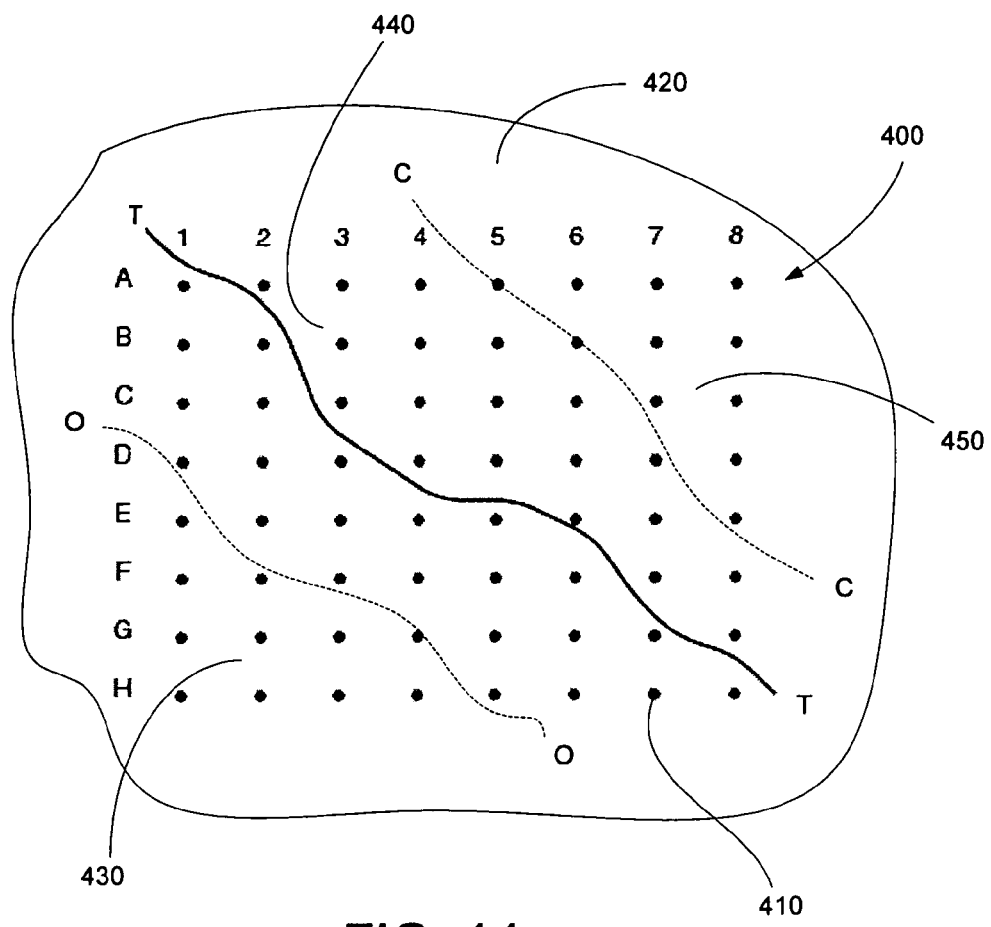
FIG. 14 is a schematic representation of boundary layer transition features on a portion of an instrumented body surface.

Referring now to FIGS. 13 and 14, the general approach to determination of CFFI lines using a two dimensional array of sensors will be discussed. FIG. 13 is a schematic representation of a sensor grid 400 having 64 sensors 410 arranged in eight rows A through H and eight columns 1 through 8 on a body surface 420. For purposes of this discussion, the sensors will be identified by combinations of row letters and column numbers.

As shown in FIG. 10, the sensor grid 400 is traversed by a CFFI line S—S. For this example, it will be assumed that line S—S is a flow bifurcation line resulting from a particular set of flow conditions. In order to establish the contour of the bifurcation line S—S, the output signals from sensors along columns, rows, and diagonals are compared to identify voltage minima. When the output signals are compared along columns 1 through 8, it is found that column-minima occur at sensor A1 and between sensor pairs B2-A2, C3-D3, D4-E4, D5-E5, E6-F6, F7-G7, and G8-H8. The locus of these points provides a first estimate of the contour of the bifurcation line S—S.

The contour may be further resolved by comparing the signals from sensors along the rows and diagonals. For example, row-minimum voltage signals will be observed in rows A through H at or between sensor pairs A1-A2, B2-B3, C2-C3, D3-D4, E5-E6, F6-F7 and G7-G8, and at H8. Diagonal-minimum voltage signals will be observed between the following pairs of sensors in the diagonal direction: B1-A2, B2-A3, C2-B3, D2-C3, D3-C4, E3-D4, E4-D5, E5-D6, F5-E6, F6-E7, G6-F7, G7-F8, and H7-G8. A combination of these three observations (along the column, row, and diagonals) provides a high resolution for determining minimum shear stress locations and thus defining the geometry of the bifurcation line S—S.

Still further resolution may be obtained by comparing time series data for each sensor. As previously discussed, time series voltage data from sensors on opposite sides of a bifurcation line will exhibit opposite phases. Accordingly, signal voltage versus time for each sensor may be compared to that of each adjacent sensor to determine where phase reversal occurs. The locus of these reversal points may be used to further refine the estimated bifurcation line geometry.

It will be understood that, depending on the size of the sensor matrix and the geometry of the body to which it is applied, more than one bifurcation line may be measured by the sensor matrix. For example, a large sensor array applied to the upper surface of a wing section may detect both the leading edge attachment line and the separation line. An array configured to cover an entire wing could also detect a second attachment line. In cases where multiple bifurcation lines intersect the sensor array, a given row or column of sensors may exhibit a corresponding number of voltage dips. Accordingly, the data received from the various sensors may be used to identify local minima in addition to overall minima. Separate loci could then be computed for the different bifurcation lines.

In most cases, visually differentiating multiple bifurcation lines to determine which are attachment lines and which are separation lines presents little difficulty. Automated methods, however, may require the assessment of certain characteristics to determine which is which. For example, a flow separation line may be distinguished from a flow attachment line based on the behavior of sensor elements just downstream of the line. With an attachment line, shear stress (and thus sensor voltage) reaches a local minimum at the line and then rapidly increases downstream. This is because the flow is attached to the surface downstream of the attachment line. In contrast, with a separation line, the region just downstream of the line is a "dead air" region. As a result, shear stress (and thus sensor voltage) downstream of the separation line will exhibit little or no increase from the local minimum at the separation line.

Accordingly, criteria for bifurcation line identification may be based on comparison of sensor readings at or near the bifurcation line to the sensor readings downstream of the bifurcation line.

Identification and location of a shock interaction line is similar to identification of bifurcation lines. The shock is generally characterized by one or more of the following three features: (a) the presence of a sharp jump (i.e., increase) in temperature (pressure and density) across the shock; (b) the presence of flow separation and reattachment; and (c) the presence of multiple shocks of lower strength under a main strong shock. The shock interaction line is similar to a flow separation line in that upstream of the line, the flow is attached and downstream of the line, the flow is separated. Accordingly, sensor readings in the region upstream of the shock interaction line and downstream of the shock interaction line will be similar to those in the attached and separated regions on either side of a separation line. A shock, however, will produce a sharp voltage decrease in sensors because of the increase in sensor temperature (and thus, resistance) caused by the presence of shock. This decrease in sensor output voltage will be even more prominent than the drop in sensor voltage associated with flow separation. In addition to signaling the presence/location of a shock, the magnitude of the voltage drop caused by heating due to the shock can be used as a relative measure of shock strength.

The geometry of a shock interaction line may be determined in a similar fashion to that described above for bifurcation lines. Based on predetermined threshold criteria, voltage spikes followed immediately by low voltage values (indicative of dead air in the separation region down stream of the shock) are identified across the rows and columns of the sensor matrix and a locus of such points determined as an estimate of the geometry of the shock interaction line.

Identifying transition boundaries and a mean transition line in using the two dimensional sensor matrix may be accomplished by combining any or all of the time series-based transition identification techniques described above for the two dimensional flow case with the matrix analysis approach described above for identification of bifurcation lines. In FIG. 14, the sensor grid 400 is traversed by an area of transition from laminar to turbulent flow characterized by a mean transition line T—T, a transition onset line O—O and a transition completion line C—C defining a laminar region 420, a transition region 430 and a turbulent region 440. Determination of the mean transition line may be accomplished by identifying locations of peak RMS voltage for each row, column or diagonal. For example, peak RMS values for each column would be expected to occur at sensor A1 and between sensor pairs B2-A2, C3-D3, D4-E4, D5-E5, E6-F6, F7-G7, and G8-H8. The locus of these points may be used to estimate the geometry of the mean transition line. Similar results may be obtained for each row and each diagonal.

Further evaluation of the data may be used to establish approximations of the transition onset line and the transition completion line. For example, an evaluation of the diagonal running from H1 to A8 would show that sensors H1 and G2 would exhibit relatively low RMS voltage indicative of a laminar flow region. Sensors F3 and E4 would exhibit increasing RMS voltage peaking between sensors E4 and D5. Sensors D5 and C6 would show decreasing RMS voltage. Sensors B7 and A8 would show a leveling of the RMS voltage at an intermediate level indicative of a turbulent boundary layer region. Similar analysis may be performed across all diagonals, all rows and all columns.

It will be understood that IF and spectral density analysis of sensor data may be performed in a similar manner to further refine the estimated transition-related CFFI lines.

Figure 15:
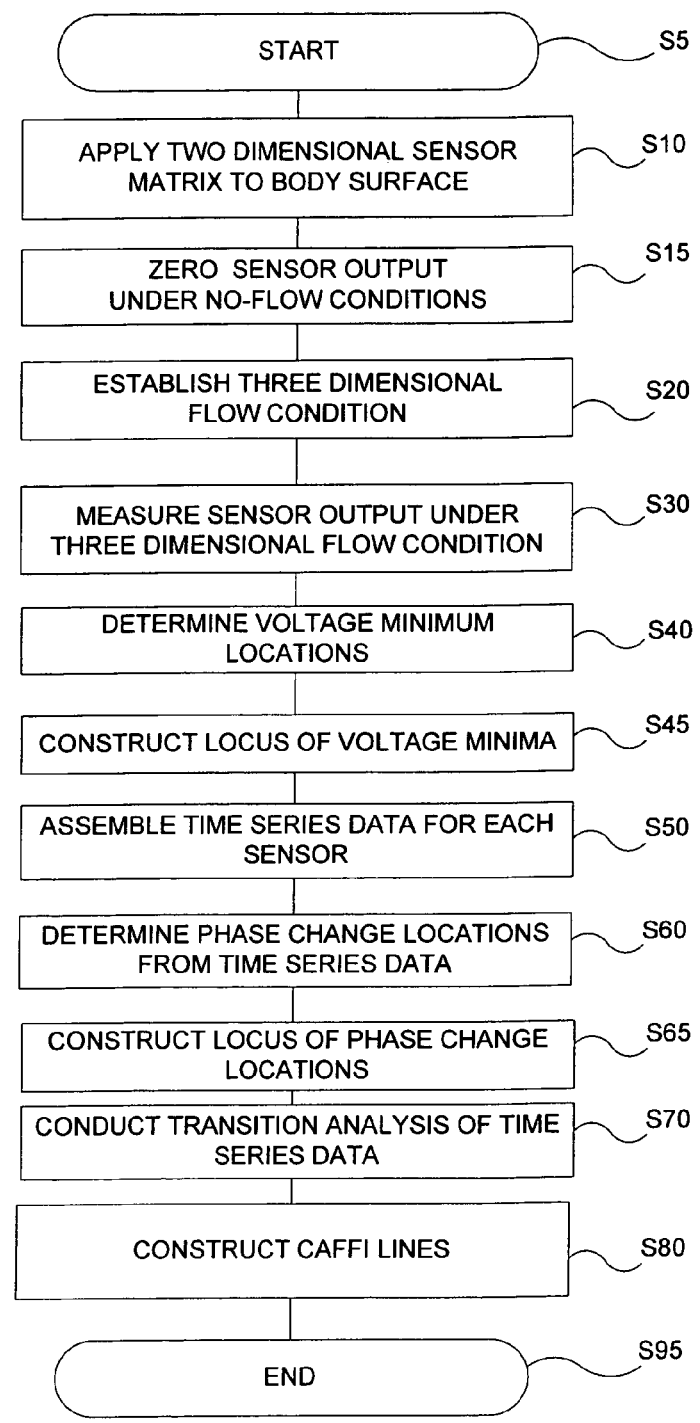
FIG. 15 is a flow diagram of a method for locating critical flow features according to an embodiment of the invention.

FIG. 15 illustrates a method of mapping CFFI lines using the above-described approach. The method begins at S5. At S10, a two dimensional sensor array is applied to a surface of a three dimensional body. The two dimensional sensor array may be applied as an orthogonal matrix of rows and columns as described above or in any other two dimensional arrangement in which the relative location of each sensor element is known. The sensors used are preferably thin film sensors having associated anemometer circuits for providing voltage signals proportional to shear stress at the body surface as described above. The anemometer circuits may include CVAs, CTAs or CCAs. At S20, the output of all the sensors may be zeroed or calibrated under no-flow conditions to assure that an accurate comparison of output between sensors may be made once a three dimensional flow condition is established.

A three dimensional flow field is established around the body at S20. The conditions associated with the flow field may be predetermined or may be measured with conventional instrumentation during acquisition of data from the sensor array. At S30, the voltage output from the sensor elements in the sensor array is measured. The voltage output data may be stored for later analysis or, in some instances, may be processed immediately for use in determining CFFI location in real time. At S40, voltage minima are determined across the sensor matrix. As discussed above, if an orthogonal sensor matrix is used, a convenient approach may be to identify minimum voltage points for each row, for each column and/or for each diagonal. At S45, one or more loci of minimum voltage points is assembled. For example, one locus may be formed from row maxima and another from columns maxima. Any one or more of the resulting loci may be used to model the bifurcation line, with the precision of the ultimate mapping of bifurcation lines increasing with the number loci used. Standard interpolation techniques may be used in combining results from the different geometric estimates.

At S50, time series data may be assembled for each sensor for use in locating phase reversal points, conducting boundary layer transition analysis or both. At S60, the time series data for each sensor are used to establish the relative phase of the output for each sensor. The data for a given sensor may be compared to the sensors adjacent the given sensor in each row, each column and/or each diagonal to locate phase reversal points, which, as previously discussed are indicative of the crossing of a bifurcation line. The loci of these points may then be assembled at S65.

At S70, the time series sensor data may be used to conduct an analysis of the data to identify and map boundary layer transition. Any or all of the above-described time-based methodologies may be used. The output of each may include any one or more of an estimated mean transition line, an estimated transition onset line and an estimated transition completion line. determine if varying output of adjacent sensors across the matrix may be compared to identify and locate phase change locations indicative of the crossing of a bifurcation line. These comparisons may again be made for each row, each column and/or each diagonal of the sensor matrix to determine a locus of phase change points. As with the voltage minima, multiple bifurcation lines cutting across the sensor matrix may produce multiple phase changes for a given row, column or diagonal. When such is the case, multiple phase change loci may be determined.

At S80, a set of CFFI lines are constructed from the loci determined from the various data assessments. The CFFI line output may be in the form of a sets of points on the body surface defining each CFFI determined to be present. Alternatively, some or all of the CFFI lines may be described mathematically. The method ends at S95.

It should be noted that, over time, the flow may dither about the mean bifurcation line. When this occurs, an increase in output voltage will be observed from the sensors away from which the bifurcation line moves and a corresponding decrease in output voltage will be observed from the sensors towards which the line moves. This movement may result in a phase reversal signature when the two time series signals from neighboring sensors are compared. Such phase reversals can be used to further resolve the contour of the separation and attachment regions, particularly in unsteady flow regimes.

The method depicted in FIG. 15 may also include actions for identifying and mapping shock interaction lines using similar analytical techniques.

It will be readily understood that other analytical techniques may be used to process the data from a two dimensional thin film sensor array. In particular, off-the-shelf analytical software is available that may be used to generate three dimensional flow contours directly from the voltage data from a two dimensional sensor array. These contours can then be used to graphically or mathematically identify CFFI locations and geometry.

Figure 16:
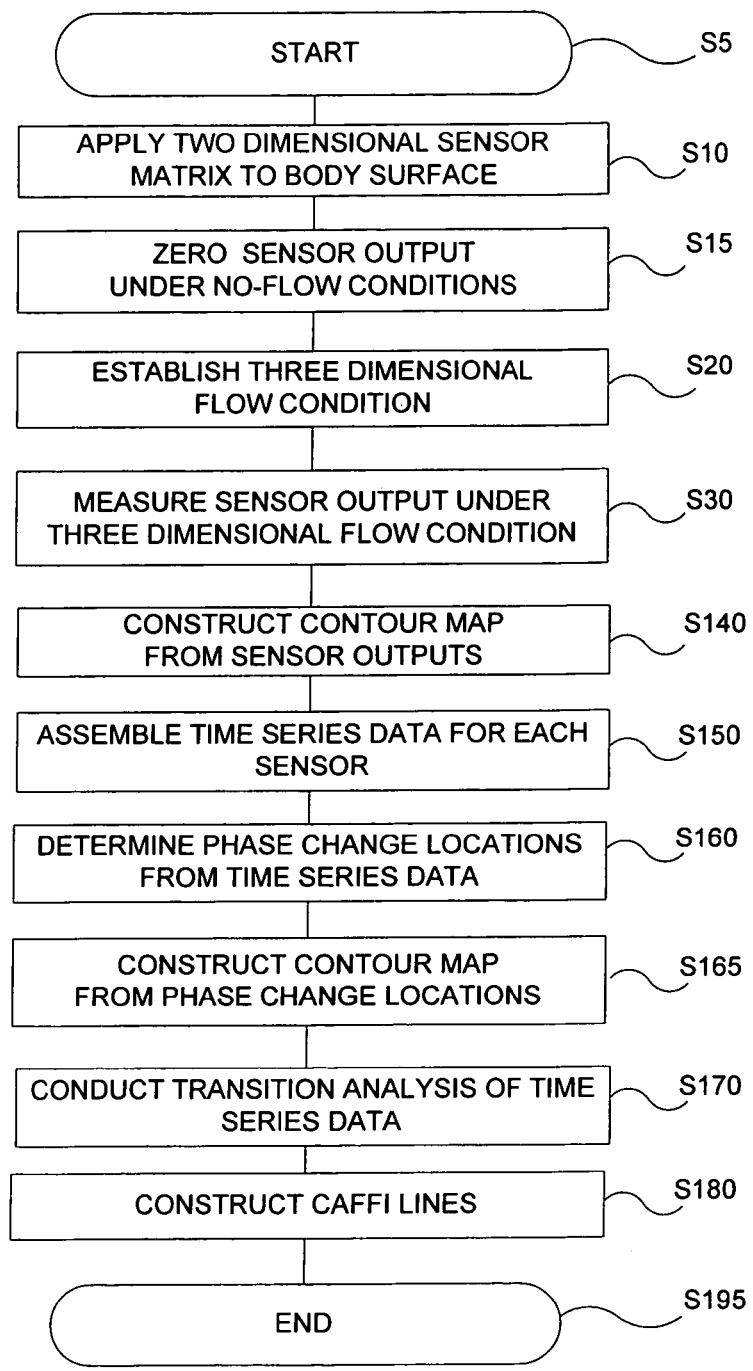
FIG. 16 is a flow diagram of a method for locating critical flow features according to another embodiment of the invention.

FIG. 16 illustrates a method of mapping CFFI lines using this approach. Initially, the method is the same as that presented in FIG. 15. The actions at S5, S10, S15, S20 and S30 are essentially unchanged. The remaining data analysis actions are modified to provide more direct mapping of the data. At S140, for example, the voltage data from the sensor matrix are assembled to form a contour map using the previously described analytical software or the equivalent. This contour map may be used to graphically or analytically identify contours associated with local minima, which in turn are associated with one or more flow bifurcation lines. At S150 and S160, time series data are assembled and used to determine phase change locations in a manner similar to that of the previous method. In the method of FIG. 16, however, the phase reversal data are used to generate a second contour map at S165, which may be used in conjunction with the first contour map in identifying bifurcation lines. Transition analysis of the time series data is conducted at S180 in a manner similar to the previous method. The method ends at S195.

Figure 17:
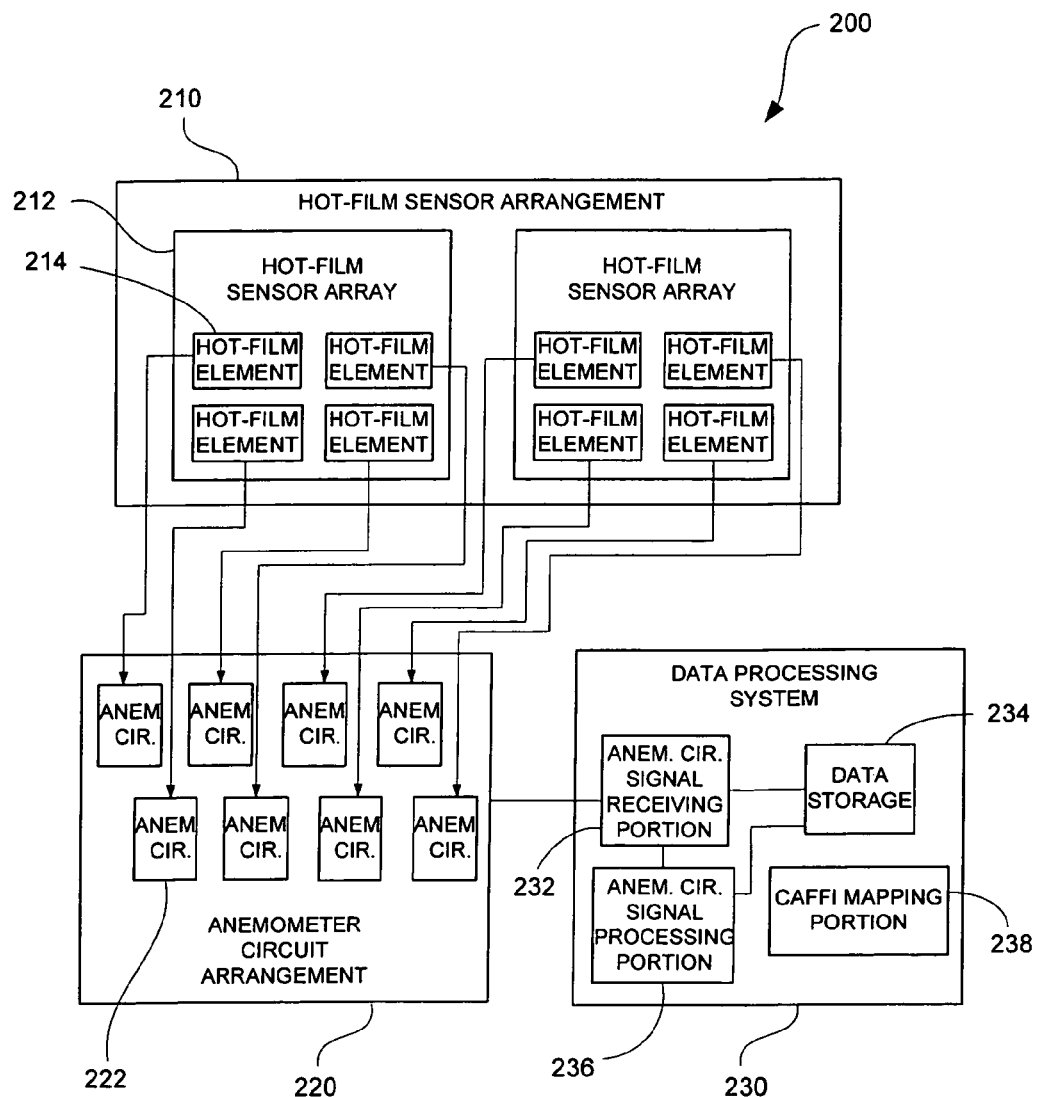
FIG. 17 is a block diagram of an automated system for locating critical flow features according to an embodiment of the invention.

Turning now to the schematic representation shown in FIG. 17, a three dimensional CFFI mapping system 200 according to an embodiment of the present invention is structured to obtain surface heat transfer data on a three dimensional body immersed in a fluid stream and to process the data to provide spatial information on flow phenomena around the body. The CFFI mapping system 200 includes a hot-film sensor arrangement 210, an anemometer arrangement 220 having a plurality of anemometer circuits and a data processing system 230.

The hot-film sensor arrangement 210 comprises one or more two dimensional hot-film sensor arrays 212, each of which comprises a plurality of hot-film sensor elements 214 positioned on a surface of the body. It will be understood that while two sensor arrays 212 are shown in FIG. 17 and that each sensor array 212 is depicted with four sensor elements 214, any number of sensor arrays 212 and sensor elements 214 may be used. The hot-film sensor elements 214 may be of the type formed from a thin metal film layer deposited on an insulated substrate as previously described. The metal film material may be nickel or platinum or other materials with a high and preferably linear changes in temperature coefficient of resistance. The metal film layer is advantageously formed with a thickness less than about 6 microns and preferably in a range from about 4.5 to about 5.5 microns and most preferably in a range from about 4.9 microns to about 5.1 microns. Other thicknesses may be used but may result in degradation of results or loss of integrity. In a preferred embodiment, each sensor element 214 may be configured in a two dimensional geometric shape adapted to reduce output dependence on flow orientation relative to the sensor element 214. The hot film sensor element 214 may be formed in a spiral or dual spiral configuration such as that shown in FIG. 12.

The hot film sensor arrays 212 may further comprise a plurality of conductive lead pairs formed on the insulated substrate, each pair of conductive leads having a first lead attached to one side of a sensor element 212 and a second lead attached to the opposite side of the sensor element 212. The conductive lead material may be copper, gold or other highly conducting materials. The insulated substrate may be formed from a pliable insulated sheet material that can be used to conform the hot film sensor arrays 212 to surface contours. In some embodiments, however, it may be possible to form the hot film sensor elements in situ on the surface of an object to be characterized.

It will be understood that the precision with which flow bifurcation lines can be identified will depend on the number and spacing of the hot-film-sensor arrays 212 and elements 214. In an ideal case, sensor arrays 212 would be spaced around the entire surface of a body with closer spacing in areas on the body that are expected to experience bifurcation phenomena. If full body coverage is impractical, sensors may be placed in only specific areas of interest.

The anemometer arrangement 220 may be positioned in or near the instrumented body. In typical flight vehicles, the anemometer circuits 222 may be positioned in disparate locations around the vehicle or may be centrally co-located. Each hot film sensor element 214 is in electrical communication with a corresponding anemometer circuit 222 of the anemometer arrangement 220. Each anemometer 222 is adapted for producing a signal based on the heat transfer from the hot-film sensor elements 214 to the fluid stream flowing around the body. The anemometer circuits 222 may be of any suitable type including CVAs, CTAs and CCAs. One particular advantage of using CVAs is that instrumentation cable lengths may be longer without sacrificing data precision and accuracy. Further, cables from different sensors need not be set to the same length to assure comparability.

Each anemometer circuit 222 of the anemometer arrangement 220 is in communication with the data processing system 230. It will be understood that the data processing system 230 may be in the form of a computer or computer system. The term "computer system" or "operating system" is to be understood to include at least one processor utilizing a memory or memories. In some embodiments some or all of the data processing system may be in the form of a digital signal processing chip (DSP).

The computer memory stores at least portions of an executable program code at one time or another during operation of the processor. In addition, the processor executes various instructions included in that executable program code. An executable program code means a program in machine language or other language that is able to run in a particular computer system environment to perform a particular task. The executable program code process data in response to commands by a user. As used herein, the terms "executable program code" and "software" are substantially equivalent.

It should also be appreciated that to practice the systems and methods of the invention, it is not necessary that the processor, or portions of the processor, and/or the memory, or portions of the memory be physically located in the same place or co-located with the instrumented body. Each of the processor and the memory may be located in geographically distinct locations and connected so as to communicate in any suitable manner, such as over a wireless communication path, for example. Each of the processor and/or the memory may also be composed of different physical pieces of equipment. It is not necessary that the processor be one single piece of equipment in one location and that the memory be another single piece of equipment in another location. The processor may be two pieces of equipment in two different physical locations connected in any suitable manner. Additionally, each respective portion of the memory described above may include two or more portions of memory in two or more physical locations, including or utilizing memory stores from the Internet, an Intranet, an Extranet, a LAN, a WAN or some other source or over some other network, as may be necessary or desired.

Software enables the data processing system 230 to perform the operations required by the methods of the invention and may be supplied on any of a wide variety of data holding media. The implementation and operation of the invention may be in the form of computer code written in any suitable programming language, which provide instructions to the computer. It should further be appreciated that the software code or programming language that is used in the data processing system 230 to may be provided in any of a wide variety of forms. Illustratively, the software may be provided in the form of machine language, assembly code, object code, source language, flash application or other program that is interpreted by a user's browser, as well as in other forms. The software may be in the form of compressed or encrypted data utilizing a known compression format or encryption algorithm.

It should also be appreciated that the particular software medium used by the data processing system 230 may take on any of a variety of physical forms. Illustratively, the medium may be in the form of a compact disk, a DVD, an integrated circuit, a hard disk, a floppy diskette, a magnetic tape, a RAM, a ROM, or a remote transmission, as well as any other medium or source of information that may be read by a computer or other operating system. Accordingly, the software used in operation of the data processing system 230 may be provided in the form of a hard disk or be transmitted in some form using a direct wireless telephone connection, the Internet, an Intranet, or a satellite transmission, for example. Further, the programming language enabling the system and method of the invention as described above may be used on all of the foregoing and any other medium by which software or executable program code, such as a flash application, may be communicated to and utilized by a computer or other operating system.

The data processing system 230 may comprise any or all of a signal receiving portion 232, a data storage portion 234, a signal processing portion 236 and a CFFI mapping portion 238. The signal receiving portion 232 is in communication with each of the anemometer circuits 222 of the anemometer arrangement 220 for receiving signals therefrom. The signals may be selectively amplified as required. The raw signals from the anemometer circuits 222 may be stored in the data storage portion 234 for later processing and/or passed to the signal processing portion 236 of the data processing system 230. The signal processing portion 236 may be programmed to digitize and process anemometer signal data from the hot-film sensor arrays 212. It will be understood that some or all of the functions of the signal processing portion 236 may alternatively be distributed between the signal receiving portion 232 and the CFFI mapping portion 238.

The CFFI mapping portion 238 may be programmed to further process the hot film sensor data to identify and map CFFIs. This processing may comprise any of the sensor data comparison, correlation or contour mapping actions of the methods discussed above. The CFFI mapping module may, in particular, include software that allows complete mapping of one or more of bifurcation contours, transition-associated contours, shock interaction lines and vortex-associated contours for instrumented areas of a three dimensional body.

The output of the CFFI mapping portion may be stored or may be made available to other processors. Processing of the sensor data may be conducted so rapidly that bifurcation line location and movement may be determined in real time. Output results may thus be provided in real time to other processors for use in load determination and/or feedback and control.

It will be understood by those of ordinary skill in the art that the systems and methods of the invention may be applied to any object or vehicle immersed in a fluid stream and are particularly adaptable for use in flight vehicles and watercraft. The invention may be applied to vehicles in their entirety or to particular structures including but not limited to hulls, wings, rudders, stabilizers, rotors and control surfaces. The invention may also be applied to scale models or portions of models for testing in wind tunnel or hydrodynamic simulation test facilities.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

It will be understood that the present invention may be practiced by adding additional steps to the method, omitting steps within the process, and/or altering the order in which the steps are performed in the process.

Accordingly, while the present invention has been described here in detail in relation to its preferred embodiment, it is to be understood that this disclosure is only illustrative and exemplary of the present invention and is made merely for the purposes of providing a full and enabling disclosure of the invention. Many modifications to the embodiments described above can be made without departing from the spirit and scope of the invention. Accordingly, the foregoing disclosure is not intended to be construed or to limit the present invention or otherwise to exclude any other such embodiments, adaptations, variations, modifications and equivalent arrangements.

What is claimed is:

1. A method for locating two dimensional critical flow features on a surface of a three dimensional body immersed in a fluid stream, the method comprising:

applying a hot film sensor array on the surface of the body, the hot film sensor array comprising a plurality of hot film sensor elements disposable over at least a portion of the body surface in two dimensions with respect to the body surface, each sensor element being connected to an associated anemometer circuit to provide an output voltage;

obtaining output voltage data for each hot film sensor element with the body immersed in the fluid stream under a set of flow conditions; and processing the hot film sensor element output voltage data to locate at least one two dimensional critical flow feature on the body surface.

2. A method according to claim 1 wherein the at least one two dimensional critical flow feature includes a flow bifurcation line.

3. A method according to claim 2 wherein the at least one flow bifurcation line includes at least one of a flow attachment line and a flow separation line.

4. A method according to claim 1 wherein the at least one two dimensional critical flow feature includes one of an estimated boundary of a boundary layer transition region and a mean transition line for a boundary layer transition region.

5. A method according to claim 1 wherein the at least one two dimensional critical flow feature includes a shock interaction line.

6. A method according to claim 1 further comprising at least one of:

zeroing the output voltage for each constant voltage anemometer under no-flow conditions; and calibrating each constant voltage anemometer under no flow conditions.

7. A method according to claim 1 wherein the action of processing the output voltage data includes:

constructing at least one locus of minimum voltage data points to determine an estimated flow bifurcation line.

8. A method according to claim 7 wherein the hot film sensor elements are arranged in a plurality of parallel rows and wherein the action of constructing a locus of minimum voltage data points includes:

determining a minimum voltage data point for each row; and constructing a locus of row minimum voltage data points.

9. A method according to claim 8 wherein the hot film sensor elements are further arranged in a plurality of parallel columns and wherein the action of constructing at least one locus of minimum voltage data points includes:

determining a minimum voltage data point for each column;

constructing a locus of column minimum voltage data points; and combining the locus of row minimum voltage data points with the locus of column minimum voltage data points to determine the estimated flow bifurcation line.

10. A method according to claim 7 wherein the action of processing the output voltage data further includes:

determining whether the flow bifurcation line is an attachment line or a separation line.

11. A method according to 10 wherein the action of determining whether the flow bifurcation line is an attachment line or a separation line includes:

comparing voltage data for hot film sensor elements on one side of the flow bifurcation line with the voltage data for hot film sensor elements on the opposite side of the flow bifurcation line.

12. A method according to claim 1 wherein the action of processing the output voltage data includes:

constructing a first locus from a first set of local minimum voltage data points to determine a first estimated flow bifurcation line; and constructing a second locus from a second set of local minimum voltage data points to determine a second estimated flow bifurcation line.

13. A method according to claim 1 wherein the action of processing the output voltage data includes:
  forming a set of constant voltage contours using the output voltage for at least a portion of the hot film sensors, each voltage contour being a representation of a line of constant shear stress at the body surface;
  identifying at least one local minimum constant voltage contour from the set of constant voltage contours; and
  establishing at least one flow bifurcation line from the at least one local minimum constant voltage contour.

14. A method according to claim 1 wherein the action of processing the output voltage data includes:
  forming a set of constant voltage contours using the output voltage for at least a portion of the hot film sensors, each voltage contour being a representation of a line of constant shear stress at the body surface;
  identifying a first local minimum constant voltage contour from the set of constant voltage contours;
  establishing a first flow bifurcation line from the first local minimum constant voltage contour;
  identifying a second local minimum constant voltage contour from the set of constant voltage contours; and
  establishing a second flow bifurcation line from the second local minimum constant voltage contour.

15. A method according to claim 1 wherein the action of processing the output voltage data includes:
  assembling a voltage data time series for each of the hot film sensors.

16. A method according to claim 15 wherein the action of processing the output voltage data further includes:
  comparing the voltage data time series for adjacent hot film sensor elements to identify sensor element pairs whose associated voltage data time series exhibit a phase reversal;
  establishing a plurality of phase reversal points based on the sensor element pairs whose associated voltage data time series exhibit phase reversal; and
  constructing a locus of phase reversal points to determine an estimated flow bifurcation line.

17. A method according to claim 15 wherein the action of processing the output voltage data further includes:
  conducting a time series data analysis to identify the existence and location of a boundary layer transition flow feature.

18. A method according to claim 17 wherein the boundary layer transition flow feature is one of a transition onset boundary, a mean transition line and a transition completion boundary.

19. A method according to claim 17 wherein the action of conducting a time series data analysis includes:
  calculating an RMS voltage over a predetermined time interval for each hot film sensor element;
  identifying sensor elements producing peak RMS voltages; and
  constructing a locus of peak RMS voltage points to determine an estimated mean transition line.

20. A method according to claim 19 wherein the hot film sensor elements are arranged in a plurality of parallel rows and wherein the action of constructing a locus of peak RMS voltage points includes:
  determining a peak RMS voltage point for each row; and
  constructing a locus of row-based peak RMS voltage points.

21. A method according to claim 20 wherein the hot film sensor elements are further arranged in a plurality of parallel columns and wherein the action of constructing a locus of peak RMS voltage points includes:
  determining a peak RMS voltage point for each column;
  constructing a locus of column-based peak RMS voltage points; and
  combining the locus of row-based peak RMS voltage points with the locus of column-based peak RMS voltage points to determine the estimated mean transition line.

22. A method according to claim 17 wherein the action of conducting a time series data analysis includes:
  applying a Fast Fourier Transform methodology to obtain spectral characteristics for the voltage data time series of each hot film sensor element;
  comparing the spectral characteristics for the voltage data time series for the hot film sensor elements to identify the hot film sensor elements positioned in laminar, transition and turbulent flow regions; and
  estimating at least one of a transition onset boundary, a mean transition line and a transition completion boundary based on identification of the hot film sensor elements positioned in laminar, transition and turbulent flow regions.

23. A method according to claim 17 wherein the action of conducting a time series data analysis includes:
  calculating an intermittence factor for each hot film sensor element;
  comparing the intermittence factors for the hot film sensor elements to identify the hot film sensor elements positioned in laminar, transition and turbulent flow regions; and
  estimating at least one of a transition onset boundary, a mean transition line and a transition completion boundary based on identification of the hot film sensor elements positioned in laminar, transition and turbulent flow regions.

24. An automated system for locating two-dimensional critical flow features on a surface of a three dimensional body immersed in a fluid stream, the system comprising:
  a hot film sensor arrangement comprising a plurality of hot film sensor elements appliable over at least a portion of the body surface in two dimensions with respect to the body surface;
  an anemometer circuit arrangement having a plurality of anemometer circuits, each anemometer circuit being in communication with an associated hot film sensor element and being configured to provide a sensor signal corresponding to heat transfer from the associated hot film sensor to the fluid stream; and
  a data processing system in communication with the anemometer arrangement, the data processing system including
    a signal receiving portion in communication with the anemometer arrangement, the signal receiving portion being adapted for receiving and processing sensor signals from the anemometer circuits and
    a critical flow feature mapping portion in communication with the signal receiving portion, the critical flow feature mapping portion being adapted for processing the sensor signals to determine the location of at least one critical flow feature line on the body surface.

25. An automated system according to claim 24 wherein the hot-film sensor elements each comprise a thin metal sensor layer having a material thickness less than about 6 microns.

26. An automated system according to claim 24 wherein the metal sensor layer is formed from nickel deposited on an insulated substrate.

27. An automated system according to claim 24 wherein the at least one critical flow feature line includes at least one of a flow bifurcation line, a shock interaction line, a boundary layer transition onset line, a mean boundary layer transition line and a mean boundary layer transition completion line.

28. An automated system according to claim 24 wherein the plurality of anemometer circuits includes at least one constant voltage anemometer circuit.

29. An automated system according to claim 24 wherein the plurality of anemometer circuits includes at least one constant temperature anemometer circuit.

30. An automated system according to claim 24 wherein the plurality of anemometer circuits includes at least one constant current anemometer circuit.

31. An automated system according to claim 24 wherein the sensor array is disposable so that the plurality of hot film sensors are arranged in a plurality of parallel rows.

32. An automated system according to claim 24 wherein the two dimensional array is formed so that the plurality of hot film sensors are arranged in a plurality of parallel rows and a plurality of columns orthogonal to the plurality of rows.

33. An automated system for locating two-dimensional critical flow features on a surface of a three dimensional body immersed in a fluid stream, the system comprising:
a hot film sensor arrangement comprising a plurality of hot film sensor elements appliable over at least a portion of the body surface in two dimensions with respect to the body surface;
sensor data acquisition means for obtaining output voltage data for each hot film sensor element with the body immersed in the fluid stream under a set of flow conditions; and
sensor data processor means for processing the hot film sensor element output voltage data to locate at least one critical flow feature line on the body surface.

34. An automated system according to claim 33 wherein the at least one critical flow feature line includes at least one of a flow bifurcation line, a shock interaction line, a boundary layer transition onset line, a mean boundary layer transition line and a mean boundary layer transition completion line.

35. An automated system according to claim 33 wherein the sensor data processor means includes means for constructing at least one locus of minimum voltage data points to determine an estimated flow bifurcation line.

36. An automated system according to claim 35 wherein the hot film sensor elements are arranged in a plurality of parallel rows and wherein the means for constructing at least one locus of minimum voltage data points is adapted to determine a minimum voltage data point for each row and to construct a locus of row minimum voltage data points.

37. An automated system according to claim 36 wherein the hot film sensor elements are further arranged in a plurality of parallel columns and wherein the means for constructing at least one locus of minimum voltage data points is further adapted to determine a minimum voltage data point for each column, construct a locus of column minimum voltage data points, and combine the locus of row minimum voltage data points with the locus of column minimum voltage data points to determine the estimated flow bifurcation line.

38. An automated system according to claim 35 wherein the sensor data processor means includes means for determining whether the flow bifurcation line is an attachment line or a separation line.

39. An automated system according to 38 wherein the means for determining whether the flow bifurcation line is an attachment line or a separation line is adapted to compare voltage data for hot film sensor elements on one side of the flow bifurcation line with the voltage data for hot film sensor elements on the opposite side of the flow bifurcation line.

40. An automated system according to claim 33 wherein the sensor data processor means includes:
means for forming a set of constant voltage contours using the output voltage for at least a portion of the hot film sensors, each voltage contour being a representation of a line of constant shear stress at the body surface;
means for identifying at least one local minimum constant voltage contour from the set of constant voltage contours; and
means for establishing at least one flow bifurcation line from the at least one local minimum constant voltage contour.

41. An automated system according to claim 33 wherein the sensor data processor means is adapted to assemble a voltage data time series for each of the hot film sensors.

42. An automated system according to claim 41 wherein the sensor data processor means includes:
means for comparing the voltage data time series for adjacent hot film sensor elements to identify sensor element pairs whose associated voltage data time series exhibit a phase reversal;
means for establishing a plurality of phase reversal points based on the sensor element pairs whose associated voltage data time series exhibit phase reversal; and
means for constructing a locus of phase reversal points to determine an estimated flow bifurcation line.

43. An automated system according to claim 41 wherein the sensor data processor means is adapted to conduct a time series data analysis to identify the existence and location of a boundary layer transition flow feature.

44. An automated system according to claim 43 wherein the boundary layer transition flow feature is one of a transition onset boundary, a mean transition line and a transition completion boundary.

* * * * *